(12) United States Patent
Shipley et al.

(10) Patent No.: US 9,026,105 B2
(45) Date of Patent: May 5, 2015

(54) SYSTEM FOR ACTIVATING AND CUSTOMIZING A MOBILE DEVICE VIA NEAR FIELD COMMUNICATION

(71) Applicant: Sprint Communications Company L.P., Overland Park, KS (US)

(72) Inventors: Trevor Daniel Shipley, Olathe, KS (US); Robert L. Spanel, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 13/831,504

(22) Filed: Mar. 14, 2013

(65) Prior Publication Data

US 2014/0274032 A1 Sep. 18, 2014

(51) Int. Cl.
*H04W 4/00* (2009.01)
*H04W 8/20* (2009.01)

(52) U.S. Cl.
CPC .............. *H04W 4/008* (2013.01); *H04W 8/205* (2013.01)

(58) Field of Classification Search
CPC .... H04W 52/24; H04W 52/02; H04B 1/3877; H04B 1/3883
USPC ............... 455/127.1, 522, 550.1, 571–574
See application file for complete search history.

(56) References Cited

U.S. PATENT DOCUMENTS

| | | | |
|---|---|---|---|
| 7,266,371 B1 | 9/2007 | Amin et al. | |
| 7,493,111 B2 | 2/2009 | Knowles | |
| 7,817,988 B2 | 10/2010 | Kruis et al. | |
| 7,904,895 B1 | 3/2011 | Cassapakis et al. | |
| 8,107,926 B2 | 1/2012 | Goto | |
| 8,185,101 B1 | 5/2012 | Wiseman et al. | |
| 8,260,281 B2 | 9/2012 | Urbanek | |
| 8,401,538 B2 | 3/2013 | Urbanek | |
| 8,401,595 B2 * | 3/2013 | Zhu et al. | 455/574 |
| 8,571,536 B2 | 10/2013 | Urbanek | |
| 8,612,967 B1 | 12/2013 | Delker | |
| 8,666,383 B1 | 3/2014 | Mauer et al. | |
| 8,825,039 B2 | 9/2014 | Mizuguchi | |

(Continued)

FOREIGN PATENT DOCUMENTS

| | | |
|---|---|---|
| WO | WO2012078753 A1 | 6/2012 |
| WO | WO2013169983 A1 | 11/2013 |

(Continued)

OTHER PUBLICATIONS

Notice of Allowance dated Apr. 26, 2012, U.S. Appl. No. 12/962,620, filed Dec. 7, 2010.

(Continued)

*Primary Examiner* — Cong Tran

(57) ABSTRACT

Embodiments of the disclosure relate generally to systems and methods for customizing the service for a mobile device via near field communication (NFC). A mobile device may comprise an activation application operable to complete a provisioning process on the mobile device to enable the device for service. The activation application may require provisioning data to be input by a user or operator of the mobile device, where provisioning data may comprise service provider information, service preference information, branding information, technical parameters, user credentials, and/or other parameters needed to customize service enablement of the mobile device, and may be communicated to the mobile device via near field communication.

20 Claims, 7 Drawing Sheets

(56) References Cited

U.S. PATENT DOCUMENTS

| | | |
|---|---|---|
| 8,909,291 B1 | 12/2014 | Spanel et al. |
| 2002/0091931 A1 | 7/2002 | Quick, Jr. et al. |
| 2004/0116163 A1 | 6/2004 | Kim et al. |
| 2004/0137890 A1 | 7/2004 | Kalke |
| 2004/0137891 A1 | 7/2004 | Clark et al. |
| 2005/0197098 A1* | 9/2005 | Trossen ............... 455/406 |
| 2006/0135144 A1 | 6/2006 | Jothipragasam |
| 2006/0154651 A1 | 7/2006 | Knowles |
| 2006/0203722 A1 | 9/2006 | Oommen |
| 2006/0208071 A1 | 9/2006 | Chang et al. |
| 2006/0236325 A1 | 10/2006 | Rao et al. |
| 2006/0246949 A1 | 11/2006 | Gupta et al. |
| 2007/0004404 A1 | 1/2007 | Buckley et al. |
| 2007/0099599 A1 | 5/2007 | Smith et al. |
| 2007/0129057 A1 | 6/2007 | Xu et al. |
| 2007/0130156 A1 | 6/2007 | U. Tenhunen et al. |
| 2007/0165654 A1 | 7/2007 | Chai et al. |
| 2007/0169084 A1 | 7/2007 | Frank et al. |
| 2007/0190939 A1 | 8/2007 | Abel |
| 2007/0250645 A1 | 10/2007 | Meadows et al. |
| 2007/0254635 A1 | 11/2007 | Montelius |
| 2008/0039114 A1 | 2/2008 | Phatak et al. |
| 2008/0046583 A1 | 2/2008 | Rao |
| 2008/0046997 A1 | 2/2008 | Wang |
| 2008/0062900 A1 | 3/2008 | Rao |
| 2008/0065753 A1 | 3/2008 | Rao |
| 2008/0167027 A1 | 7/2008 | Gautier et al. |
| 2008/0171532 A1 | 7/2008 | Shieh et al. |
| 2008/0225806 A1 | 9/2008 | Arian et al. |
| 2008/0281511 A1 | 11/2008 | Miyata |
| 2008/0318547 A1 | 12/2008 | Ballou, Jr. et al. |
| 2009/0061840 A1 | 3/2009 | Fleischman et al. |
| 2009/0093242 A1 | 4/2009 | Bhalekar et al. |
| 2009/0106200 A1 | 4/2009 | Salinas et al. |
| 2009/0156209 A1 | 6/2009 | Franklin et al. |
| 2009/0239518 A1 | 9/2009 | Feuillette |
| 2009/0247124 A1 | 10/2009 | de Atley et al. |
| 2009/0260004 A1 | 10/2009 | Datta et al. |
| 2010/0048193 A1 | 2/2010 | Ortion et al. |
| 2010/0060456 A1* | 3/2010 | Forster ............... 340/572.7 |
| 2010/0075669 A1 | 3/2010 | Sparks et al. |
| 2010/0133335 A1 | 6/2010 | Maguid et al. |
| 2010/0136960 A1 | 6/2010 | Knezevic |
| 2010/0159876 A1 | 6/2010 | Brown et al. |
| 2010/0161724 A1 | 6/2010 | Sathyan et al. |
| 2010/0167696 A1 | 7/2010 | Smith et al. |
| 2010/0192120 A1 | 7/2010 | Raleigh |
| 2010/0203864 A1 | 8/2010 | Howard |
| 2010/0207742 A1 | 8/2010 | Buhot et al. |
| 2010/0222047 A1 | 9/2010 | Vanderlinden et al. |
| 2010/0262638 A1 | 10/2010 | Fitzgerald |
| 2010/0311404 A1 | 12/2010 | Shi et al. |
| 2010/0325622 A1 | 12/2010 | Morton |
| 2010/0332639 A1 | 12/2010 | Diaz et al. |
| 2011/0003590 A1 | 1/2011 | Yoon et al. |
| 2011/0014913 A1 | 1/2011 | Yoon et al. |
| 2011/0026501 A1 | 2/2011 | Sharaga et al. |
| 2011/0030062 A1 | 2/2011 | Hsu et al. |
| 2011/0035421 A1 | 2/2011 | Laird-McConnell et al. |
| 2011/0138074 A1 | 6/2011 | Onda et al. |
| 2011/0161659 A1 | 6/2011 | Himawan et al. |
| 2011/0165836 A1 | 7/2011 | Dixon et al. |
| 2011/0208338 A1 | 8/2011 | Eteminan et al. |
| 2011/0230136 A1 | 9/2011 | Washiro |
| 2011/0258249 A1 | 10/2011 | Biggs et al. |
| 2011/0263294 A1* | 10/2011 | Kim et al. ............... 455/558 |
| 2011/0306318 A1 | 12/2011 | Rodgers et al. |
| 2012/0036282 A1 | 2/2012 | Chen et al. |
| 2012/0046022 A1 | 2/2012 | Kalke et al. |
| 2012/0047227 A1 | 2/2012 | Haggerty et al. |
| 2012/0129513 A1 | 5/2012 | van der Laak |
| 2012/0129572 A1 | 5/2012 | Johnstone et al. |
| 2012/0135733 A1 | 5/2012 | Cormier et al. |
| 2012/0203824 A1 | 8/2012 | Oommen |
| 2012/0208511 A1 | 8/2012 | Vanderlinden et al. |
| 2012/0260095 A1 | 10/2012 | Von Hauck et al. |
| 2012/0276872 A1 | 11/2012 | Knauth et al. |
| 2012/0282891 A1 | 11/2012 | Mohammed et al. |
| 2013/0023235 A1 | 1/2013 | Fan et al. |
| 2013/0031191 A1 | 1/2013 | Bott |
| 2013/0046951 A1 | 2/2013 | Jones |
| 2013/0065578 A1 | 3/2013 | Raleigh et al. |
| 2013/0085914 A1 | 4/2013 | McPherson et al. |
| 2013/0111461 A1 | 5/2013 | Zubas et al. |
| 2013/0303142 A1 | 11/2013 | Burcham et al. |
| 2014/0080467 A1 | 3/2014 | Urbanek |
| 2014/0113610 A1 | 4/2014 | Ramprasad et al. |
| 2014/0206313 A1 | 7/2014 | Spanel et al. |
| 2014/0228012 A1 | 8/2014 | Annan et al. |
| 2014/0228042 A1 | 8/2014 | Annan et al. |

FOREIGN PATENT DOCUMENTS

| | | |
|---|---|---|
| WO | WO2014046814 A1 | 3/2014 |
| WO | WO2014113128 A1 | 7/2014 |
| WO | WO2014123758 A1 | 8/2014 |
| WO | WO2014123759 A1 | 8/2014 |
| WO | WO2014158430 A1 | 9/2014 |

OTHER PUBLICATIONS

Notice of Allowance dated Nov. 2, 2012, U.S. Appl. No. 13/556,202, filed Jul. 24, 2012.

Notice of Allowance dated Jun. 11, 2013, U.S. Appl. No. 13/752,386, filed Jan. 28, 2013.

First Action Interview Pre-Interview Communication dated Feb. 25, 2013, U.S. Appl. No. 13/149,505, filed May 31, 2013.

First Action Interview Office Action dated May 8, 2013, U.S. Appl. No. 13/149,505, filed May 31, 2013.

Notice of Allowance dated Aug. 9, 2013, U.S. Appl. No. 13/149,505, filed May 31, 2013.

First Action Interview Pre-Interview Communication dated Aug. 13, 2013, U.S. Appl. No. 13/335,941, filed Dec. 23, 2011.

Notice of Allowance dated Oct. 9, 2013, U.S. Appl. No. 13/335,941, filed Dec. 23, 2011.

First Action Interview Pre-Interview Communication dated Apr. 23, 2014, U.S. Appl. No. 13/622,234, filed Sep. 18, 2012.

Final Office Action dated Sep. 19, 2014, U.S. Appl. No. 13/622,234, filed Sep. 18, 2012.

FAIPP Pre-Interview Communication dated Mar. 19, 2014, U.S. Appl. No. 13/744,847, filed Jan. 18, 2013.

Notice of Allowance dated Aug. 4, 2014, U.S. Appl. No. 13/744,847, filed Jan. 18, 2013.

FAIPP Pre-Interview Communication dated Jul. 16, 2014, U.S. Appl. No. 13/744,861, filed Jan. 18, 2013.

First Action Interview Pre-Interview Communication dated Apr. 3, 2014, U.S. Appl. No. 13/763,434, filed Feb. 8, 2013.

Final Office Action dated Aug. 19, 2014, U.S. Appl. No. 13/763,434, filed Feb. 8, 2013.

Foreign Communication from a Related Counterpart—International Search Report and Written Opinion, dated Feb. 29, 2012, PCT/US2011/063736, filed on Dec. 7, 2011.

Foreign Communication from a Related Counterpart Application, Preliminary Report on Patentability, dated Jun. 20, 2013, PCT/US2011/063736 filed on Dec. 7, 2011.

Foreign Communication from a Related Counterpart—International Search Report and Written Opinion, dated Jul. 24, 2013, PCT/US13140278, filed on May 9, 2013.

Foreign Communication from a Related Counterpart—International Search Report and Written Opinion, dated Nov. 14, 2013, PCT/US13/55023, filed on Aug. 15, 2013.

Foreign Communication From a Related Counterpart Application, International Search Report and Written Opinion dated Jan. 24, 2014, International Application No. PCT/US13/68981 filed on Nov. 7, 2013.

Foreign Communication from a Related Counterpart—International Search Report and Written Opinion, dated May 19, 2014, PCT/US14/13936, filed on Jan. 30, 2014.

(56) References Cited

OTHER PUBLICATIONS

Foreign Communication from a Related Counterpart—International Search Report and Written Opinion, dated May 14, 2014, PCT/US14/13939, filed on Jan. 30, 2014.
Delker, Jason R., "Loading Branded Media Outside System Partition", filed Oct. 30, 2013 U.S. Appl. No. 14/066,947.
Mauer, Brian D., et al., "Automatic Branding of Generic Applications", filed Jan. 10, 2013, U.S. Appl. No. 14/152,627.
Spanel, Robert L., et al., Patent Application entitled "Dynamic Remotely Managed SIM Profile" U.S. Appl. No. 13/744,847, filed Jan. 18, 2013.
Annan, Brandon C., et al.,"Electronic Fixed Brand Labeling", filed Feb. 8, 2013, U.S. Appl. No. 13/763,443.
Ghoshal, Jagannath, et al.,"Rebranding a Portable Electronic Device While Maintaining User Data", filed May 22, 2013, U.S. Appl. No. 13/899,567.
Ghoshal, Jagannath, et al.,"System and Method for Retrofitting a Branding Framework into a Mobile Communication Device", filed May 21, 2013, U.S. Appl. No. 13/899,566.
Urbanek, Robert E., "Delivery of Branding Content and Customizations to a Mobile Communication Device", filed Oct. 23, 2013, U.S. Appl. No. 14/060,712.
Urbanek, Robert E., "Delivery of Branding Content and Customizations to a Mobile Communication Device", filed , 201, International Serial No. PCT/US14/56778.
Urbanek, Robert E., "Implementation of Remotely Hosted Branding Content and Customizations", filed Oct. 23, 2013, U.S. Appl. No. 14/085,474.
Urbanek, Robert E., "Subscriber Identity Module Virtualization", filed Nov. 20, 2013, U.S. Appl. No. 14/060,719.
Indurkar, Dhananjay, "System and Method of Branding a Device Independent of Device Activation", filed Jan. 24, 2014, U.S. Appl. No. 14/163,035.
Sumner, Bret D., "Directing Server Connection Based on Location Identifier", filed Aug. 15, 2013, U.S. Appl. No. 13/968,259.
Abou-El-Ella, Hassan, et al., "Segmented Customization Payload Delivery", filed Aug. 27, 2013, U.S. Appl. No. 14/010,518.
Sumner, Bret D., "Segmented Customization Package Within Distributed Server Architecture", filed Aug. 27, 2013, U.S. Appl. No. 14/010,522.
Masterson, Michelle E., et al., "Development and Testing of Payload Receipt by a Portable Electronic Device", filed Aug. 27, 2013, U.S. Appl. No. 14/010,523.
Masterson, Michelle E., et al., "System and Methods for Deferred and Remote Device Branding", filed Aug. 27, 2013, U.S. Appl. No. 14/010,524.
Masterson, Michelle E., et al., "System and Methods for Deferred and Remote Device Branding", filed Jul. 16, 2014, International Serial No. PCT/US14/46773.
Callan, Jeffery S., et al., "Delivery of Oversized Branding Elements for Customization", filed Nov. 6, 2013, U.S. Appl. No. 14/073,321.
Indurkar, Dhananjay, "Background Delivery of Device Configuration and Branding", filed Jan. 16, 2014, U.S. Appl. No. 14/157,507.
Ahn, Chul Jin, et al., "Separation of Client Identification Composition from Customization Payload to Original Equipment Manufacturer Layer", filed Nov. 8, 2013, U.S. Appl. No. 14/075,687.
Ghoshal, Jagannath, et al., "Multiple Carrier Partition Dynamic Access on a Mobile Device", filed Jun. 5, 2014, U.S. Appl. No. 14/297,429.
Indurkar, Dhananjay, "Activation Sequence Using Permission Based Connection to Network", filed Jan. 24, 2014, U.S. Appl. No. 14/163,041.
Ahn, Chul Jin, et al., "Customization for Preloaded Applications", filed Mar. 31, 2014, U.S. Appl. No. 14/231,718.
First Action Interview Pre-Interview Communication dated Sep. 22, 2014, U.S. Appl. No. 13/468,028, filed May 9, 2013.
Foreign Communication from a Related Counterpart—International Search Report and Written Opinion, dated Jun. 3, 2014,PCT/US14/16650, filed on Feb. 16, 2014.
Advisory Action dated Dec. 17, 2014, U.S. Appl. No. 13/622,234, filed Sep. 18, 2012.
Notice of Allowance dated Nov. 22, 2014, U.S. Appl. No. 13/744,861, filed Jan. 18, 2013.
First Action Interview Pre-Interview Communication dated Oct. 22, 2014, U.S. Appl. No. 13/763,428, filed Feb. 8, 2013.
First Action Interview Pre-Interview Communication dated Nov. 20, 2014, filed on May 21, 2013.
Foreign Communication from a Related Counterpart Application, "Preliminary Report on Patentability," dated Nov. 20, 2014, PCT/US13/40278 filed on May 9, 2013.
Foreign Communication from a Related Counterpart—International Search Report and Written Opinion, dated Dec. 17, 2014, PCT/US14/46773, filed on Jul. 16, 2014.
Foreign Communication from a Related Counterpart—International Search Report and Written Opinion, dated Dec. 30, 2014, PCT/US14/56778, filed Sep. 22, 2014.
Spanel, Robert L., et al., Patent Application entitled "Dynamic Remotely Managed SIM Profile" U.S. Appl. No. 14/522,586, filed Oct. 24, 2014.
Koller, Gary D., et al., "Out of the Box Experience (OOBE) Country Choice Using Wi-Fi Layer Transmission," filed Oct. 31, 2014, U.S. Appl. No. 14/530,666.

\* cited by examiner

SYSTEM FOR ACTIVATING AND CUSTOMIZING A MOBILE DEVICE VIA NEAR FIELD COMMUNICATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile devices may be operated by different service providers or networks, and may be operated with different settings, user preferences, and/or service preferences. A mobile device (or a universal integrated circuit card in a mobile device) may be manufactured with the intention of being used only on one carrier's network, and may be customized for that network at time of manufacture. Mobile devices may be purchased and stocked for multiple carriers and may not be enabled to operate on another network.

SUMMARY

In an embodiment, a method of provisioning a mobile device is disclosed. The method comprises: powering a near field communication transceiver on the mobile device with an energizing field, wherein the mobile device is not powered by any other source; communicating provisioning data to the mobile device via near field communication; and storing the provisioning data in storage on the mobile device wherein the storage is associated with the near field communication transceiver, wherein the provisioning data is used to complete a provisioning process on the mobile device.

In an embodiment, a method of provisioning a mobile device is disclosed. The method comprises: temporarily powering a near field communication transceiver on a mobile device with an energizing field, wherein the energizing field is provided by a provisioning platform at a retail location; communicating provisioning data to the mobile device via near field communication, wherein communicating is completed while the device is not powered by a battery coupled to the device; storing the provisioning data in a secure element on the mobile device wherein the secure element is associated with the near field communication transceiver; powering on the device using the battery coupled to the device; and completing a provisioning process using the provisioning data stored on the mobile device.

In an embodiment, a method of provisioning or performing maintenance on a mobile device is disclosed. The method comprises: powering an antenna on the mobile device with an energizing field, wherein the mobile device is not powered by any other source; communicating provisioning or maintenance data to the mobile device via a communication field; and storing the provisioning or maintenance data in storage on the mobile device, wherein the storage is associated with the antenna.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
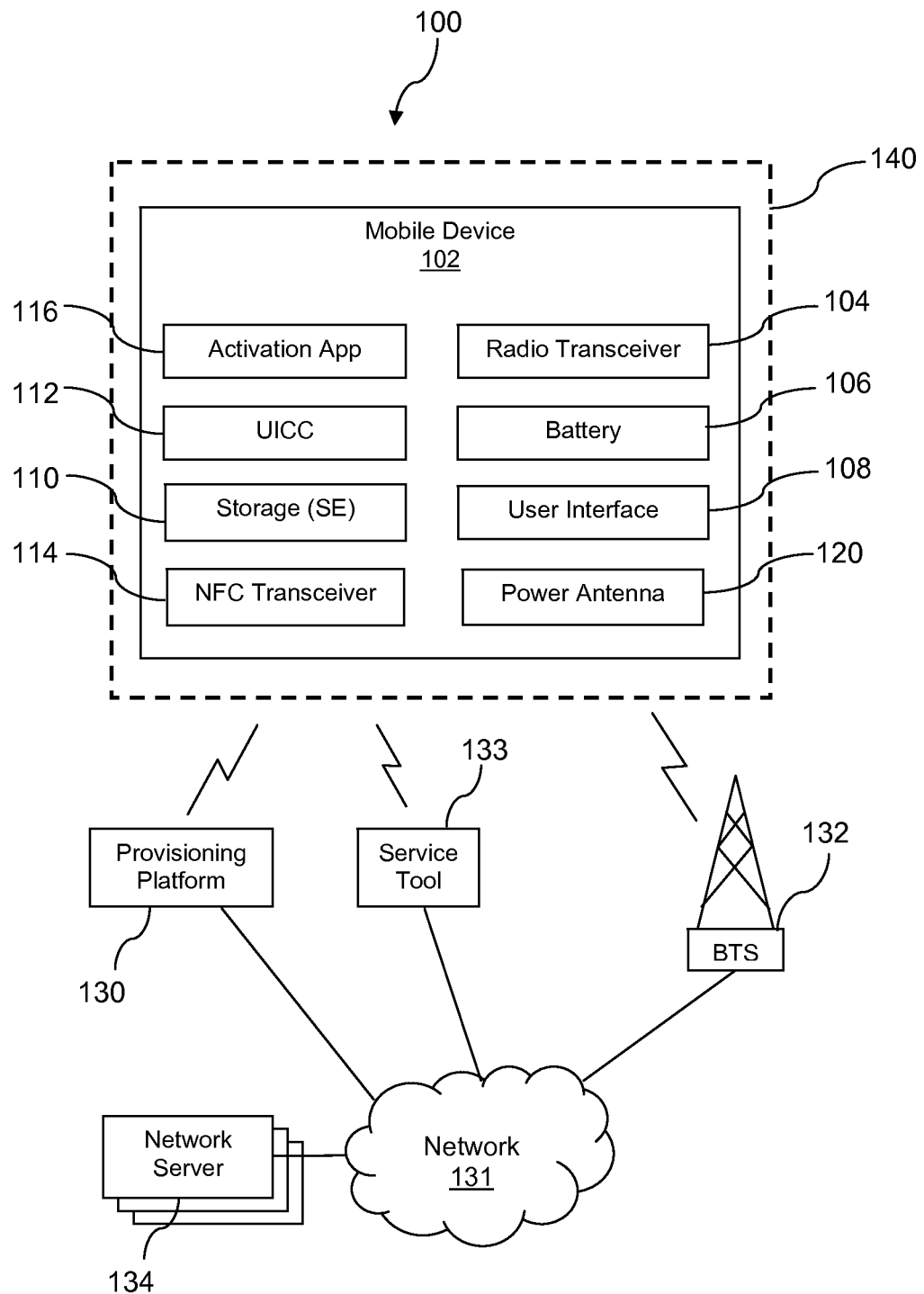
FIG. 1 is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Embodiments of the disclosure relate generally to systems and methods for customizing the service for a mobile device via near field communication (NFC). A mobile device may comprise an activation application operable to complete a provisioning process on the mobile device to enable the device for service. The activation application may prompt for provisioning data to be input by a user or operator of the mobile device, where provisioning data may comprise service provider information, service preference information, branding information, technical parameters, user credentials, and/or other parameters to customize service enablement of the mobile device, and may be potentially sensitive information.

It is understood that branding information, branding firmware and/or branding content may comprise a wide variety of items. This may include various branded graphics including but not limited to application splash screens, backgrounds, themes, wallpapers, icons, and images. This may include branded application executable instructions. This may include customized controls and switches. This may include interfaces such as a link to a branded on-line store. This may include an interface to a branded voicemail application such as a pre-loaded short code. This may include preferred universal reference locators that may be provided as pre-loaded favorites in a web browser or elsewhere on a presentation screen of the electronic device. This may include other media and settings. This may include a branded interface and applications pack as discussed further below. In the interest of being concise, hereinafter brand identity, branding firmware, and/or branding content will be referred to collectively as branding information.

The provisioning data used by the activation application may be communicated to the mobile device via near field communication (NFC), where the device may comprise an NFC transceiver and storage association with the NFC transceiver. The NFC transceiver may communicate with a provisioning platform, such as at a retail location, and the provisioning platform may receive the provisioning data via a wired or wireless connection with a network and/or network server. The NFC transceiver may receive power from an external radio energy source, such as the provisioning platform, and when powered, the NFC transceiver may receive the provisioning data from the provisioning platform via near field communication. Communication of the provisioning data over near field communication may reduce the time for transfer as well as the load on the network in communication with the mobile device. Additionally, near field communication may allow for provisioning data to be communicated to the device in an area without sufficient coverage over the network. The mobile device may be provisioned when it is powered off and/or when a battery is not installed by being powered by an external radio energy field.

Turning now to FIG. 1, a communication system 100 is described. In an embodiment, the communication system 100 comprises a mobile device 102 comprising a cellular radio transceiver 104, a near field communication (NFC) transceiver 114, storage (which may comprise a secure element) 110, a user interface 108, and an optional Universal Integrated Circuit Card (UICC) 112. The mobile device 102 may engage in a variety of communication exchanges and may be implemented as a variety of devices such as a mobile phone, a personal digital assistant (PDA), a media player, a laptop computer, a tablet computer, and other electronic devices having a macro cellular radio transceiver. The device 102 is configured to use the radio transceiver 104 to establish a wireless communication link with a base transceiver station (BTS) 132, and the base transceiver station 132 provides communications connectivity of the device 102 to a network 131. The network 131 may comprise any combination of private and public networks. The network 131 may also provide communication with one or more network servers 134.

It is understood that the system 100 may comprise any number of mobile communication devices 102 and any number of base transceiver stations 132. The collectivity of base transceiver stations 132 may be said to comprise a radio access network, in that these base transceiver stations 132 may provide radio communication links to the mobile communication devices 102 to provide access to the network 131. The radio access network may be abstracted in different ways and may comprise, in addition to the base transceiver stations 132, servers and data stores such as home location registers (HLRs) or servers that implement the functionality of home location registers, visitor location registers (VLRs) or servers that implement the functionality of visitor location registers, base station controllers (BSCs), mobile switching centers (MSCs), and other network nodes that are specifically associated with providing wireless access and connectivity to the mobile communication devices 102.

The radio transceiver 104 may communicate with the base transceiver station 132 using any of a variety of wireless communication protocols including but not limited to a code division multiple access (CDMA) wireless communication protocol, a global system for mobile communication (GSM) wireless communication protocol, a long-term evolution (LTE) wireless communication protocol, a world-wide interoperability for microwave access (WiMAX) wireless communication protocol, or another wireless communication protocol. The wireless link between the mobile device 102 and the base transceiver station 132 may couple the mobile device 102 to the network 131. In an embodiment, the mobile communication device 102 may have other components (not shown) such as a wireless local area network (WLAN) radio transceiver or other components.

The user interface 108 of the mobile device 102 may, in some embodiments, comprise a display, an input system, a speaker system, and/or a microphone. In some embodiments, the display may comprise a screen, and the input system may comprise a keypad and/or a touch screen, for example. The speaker system may communicate audio (such as media, messages, or phone call audio) to a user of the mobile device 102. The microphone may receive voice and/or audio from a user and/or communicate audio to a user. In an embodiment, a user may utilize the user interface 108 to communicate with the mobile device 102, for example, to initiate the execution of an application on the mobile device 102. Additionally, a user may receive communication from the mobile device 102 via the user interface 108, such as messages, emails, contact information, caller identification, call history, internet access, etc. A user may additionally employ the user interface 108 for viewing and/or listening to media such as music, movies, shows, videos, photos, games etc.

In an embodiment, the mobile device 102 may complete a provisioning process when it is powered up for the first time after purchase by a user. The provisioning process may use provisioning data or information provided by a service provider for the mobile device 102, wherein the provisioning data or information may be in the form of a provisioning payload. In some embodiments, the provisioning process may be completed by an activation application 116 on the mobile device 102, wherein the activation application 116 may receive provisioning data or information before completing the provisioning process. Provisioning data or information may comprise service provider information, service preference information, branding information, technical parameters user credentials, and/or other parameters needed to customize service enablement of the mobile device 102, and may be potentially sensitive information. In some embodiments, a mobile device 102 may be re-provisioned at some point during the lifespan of the device and may repeat a provisioning process. In some embodiments, the activation application 116 may comprise a secure application which may be executed by a secure element (SE).

In an embodiment, the provisioning data may be provided by the network server 134 in communication with the provisioning platform 130. The network server 134 may receive preferences input by a user and may compile the provisioning data to be sent to the mobile device 102. In an embodiment, the network server 134 may be operated by a particular service provider or carrier, and the provisioning platform 130 may be operable to communicate with more than one network server 134 operated by more than one service provider.

In an embodiment, the mobile device 102 may communicate with a provisioning platform 130 via the near field communication (NFC) transceiver 114 based on a short range wireless communication protocol. In some embodiments, the provisioning platform 130 may comprise a near field communication transceiver operable to emit an energizing field and/or a communication field. The energizing field may be operable to power NFC-enabled devices in the vicinity of the provisioning platform 130, such as the NFC transceiver 114 of the mobile device 102, as well as the storage 110 associated with the NFC transceiver 114. The mobile device 102 may not be powered by any other source, and may not have a battery 106 installed. In an embodiment, the provisioning platform 130 may be located at a retail location and may be operable to communicate provisioning data to a mobile device 102 via the NFC transceiver 114 on the mobile device 102. Provisioning data may be communicated to the provisioning platform 130 via an internet connection with the network 131 and then communicated via the provisioning platform 130 to the NFC transceiver 114 and possibly the associated storage 110. The provisioning platform 130 may communicate the provisioning data over a communication field, wherein the communication field may be separate from the energizing field.

In some embodiments, the provisioning data may comprise a relatively small amount of data, such as approximately 2 kilobytes of data. In other embodiments, the provisioning data may comprise larger amounts of data, such as about 20 kilobytes or about 200 kilobytes. Those skilled in the art will understand that some embodiments may not be limited to a particular range of data size that can be transferred. In some embodiments, the power provided to the NFC transceiver 114 from the provisioning platform 130 may vary based on the size of the provisioning data that is to be communicated, wherein greater amounts of data may entail using higher amounts of power to be transferred. In some embodiments, the provisioning data received by the NFC transceiver 114 may comprise all of the data needed to complete the provisioning process. In other embodiments, the provisioning data may only comprise a portion of the data needed to complete the provisioning process, wherein the remaining data may be received via an over-the-air connection between the mobile device 102 and the network 131. Additionally, the provisioning data may comprise data that lives on the mobile device 102 that is used to complete the provisioning process, and the activation application 116 may also rely on over-the-air access to data that lives in the network 131 to complete the provisioning process.

As an example, a user may purchase the mobile device 102 at a retail location. The retailer may compile provisioning data (or a provisioning payload) to be communicated to the mobile device 102, such as service preferences input by the user, and may communicate the provisioning data to the mobile device 102 by placing the mobile device 102 on or near the provisioning platform 130. The provisioning platform 130 may temporarily power the NFC transceiver 114 of the mobile device 102 and may communicate the provisioning data to the NFC transceiver 114, wherein the provisioning data may be stored by a storage 110 associated with the NFC transceiver 114. This process may, in some embodiments, be completed without powering the device 102 by any means other than the energizing field of the provisioning platform 130 (such as with a coupled battery 106, for example) and/or without removing the mobile device 102 from retail packaging 140. It is understood that mobile devices 102 are commonly packed for shipment and/or for display in a retail location with the battery 106 not installed.

After the provisioning data has been communicated to and stored on the mobile device 102, the mobile device 102 may be powered on using the coupled battery 106. When powered on, an activation application 116 may execute a provisioning process, which may comprise an initial step of searching out provisioning data, wherein the activation application 116 may search the storage 110 associated with the NFC transceiver 114. In some embodiments, the activation application 116 may automatically search the storage 110 for provisioning data every time the mobile device 102 is powered on and/or if the mobile device 102 has not been provisioned. In some embodiments, the storage 110 may be cleared after the activation application 116 has accessed the provisioning data, and the activation application 116 may be triggered to initiate the provisioning process if data is present in the storage 110. In some embodiments, the activation application 116 may store the provisioning data in memory on the mobile device 102 during the provisioning process. In some embodiments, the memory may comprise a universal integrated circuit card (UICC) 112.

In some embodiments, the storage 110 associated with the NFC transceiver 114 may comprise a secure element (SE). As is known to those with skill in the art, a secure element 110 may be a specialized semiconductor device and/or semiconductor chip that is designed to thwart attempts to reverse engineer the secure element or to physically slice and examine the secure element under a microscope. In an embodiment, the secure element 110 may be provided in a separate first memory chip. This semiconductor technology may be employed to store confidential information such as financial account balances, fund balances, and/or electronic money. The secure element 110 may allow only a limited number of applications to access the secure element 110 and/or may limit the functions that may be initiated by applications. In an embodiment, the near field communication transceiver 114 may be coupled to the secure element 110 to promote secure payment interactions, for example between the NFC transceiver 114 and a point-of-sale terminal (not shown). In alternative embodiments, the storage 110 may comprise memory within the NFC transceiver 114 itself. The storage 110 may also be any type of storage external to the NFC transceiver 114 which may be associated with or coupled to the NFC transceiver 114.

In an exemplary embodiment, a mobile device 102 may be purchased at a retail location. A retail location may comprise a service desk manned by an employee, a self-service kiosk or vending machine, and/or a fulfillment center at a warehouse, manufacturing, or storage facility. The use of near field communication (NFC) to deliver provisioning data to a mobile device 102 may serve to decrease the load on the network 131 at the retail location. Additionally, some retail locations may be located in an area without sufficient network coverage to deliver provisioning data over the network 131, such as an airport, mall, or remote warehouse, for example. Thus, the use of near field communication may allow a mobile device 102 to be provisioned without requiring immediate over-the-air access to the network 131.

In an embodiment where the mobile device 102 is purchased at a service desk manned by an employee, the service desk may comprise a provisioning platform 130, which may be in the form of an NFC-enabled pad, for example. The employee may place the mobile device 102 (which may remain in the retail packaging 140) on the provisioning platform 130 and then communicate provisioning data to the mobile device 102 via the provisioning platform 130, as described above. The mobile device 102 may then complete the provisioning process when the customer (or user of the mobile device 102) powers on the mobile device 102, such as with a coupled battery 106.

In an embodiment wherein the mobile device 102 is purchased from a self-service kiosk or vending machine, the customer or user may choose a device 102 and input service preferences to the kiosk (via a user interface, for example), wherein the service preferences may be used to compile provisioning data via a wired or wireless connection between the provisioning platform 130 and the network 131. The mobile device 102 may then be placed near the provisioning platform 130, wherein the provisioning platform 130 may be located within the kiosk or vending machine, or it may be outside the kiosk, wherein a user would manually place the mobile device 102 on or near the provisioning platform 130. Then, the provisioning platform 130 may communicate the provisioning data to the mobile device 102, as described above. This process may be completed without removing the mobile device 102 from retail packaging 140. The mobile device 102 may then complete the provisioning process when the customer (or user of the mobile device 102) powers on the mobile device 102, such as with a coupled battery 106.

In an embodiment wherein the mobile device 102 is purchased from a warehouse fulfillment center, a user may complete the purchase on a website, wherein user preferences may be input to the purchase information and communicated to the fulfillment center. The purchased mobile device 102 may be placed on or near a provisioning platform 130, wherein, in some embodiments, the provisioning platform 130 may be a part of an assembly line process and/or a fulfillment process. The provisioning platform 130 may receive provisioning data over the network 131 compiled from the input user preferences and may communicate the provisioning data to the mobile device 102 via the NFC transceiver 114, as described above. Then, the mobile device 102 may be shipped to the user, wherein the mobile device 102 may complete a provisioning process when powered on by the user. In an embodiment, the mobile device 102 may not be removed from retail packaging 140 throughout the process at the fulfillment center.

In an embodiment, the provisioning platform may be located in a "safe chamber" operable to shield users, employees, or others who may be near to the radio field emitted by the provisioning platform 130. The safe chamber may allow for the field strength to be increased to levels that would not otherwise be safe for exposure. Increased field strength, for the energizing field and/or the communication field, may allow for larger amounts of data to be transferred at higher rates. Additionally, increased field strength may promote communication in general with antennas and transceivers, especially if the antennas are of lower grade.

In an embodiment, the mobile device 102 may communicate with a service tool 133 using the near field communication transceiver 114 based on a short range wireless communication protocol, and the service tool 133 may couple the mobile device 102 to the network 131. The service tool 133 may be operable to perform maintenance and/or updates on the mobile device 102. The service tool 133 may also be operable to communicate data to provision (or re-provision) the mobile device 102. In one embodiment, the service tool 133 may be used to perform a software update on the mobile device 102, wherein the update may be completed without cellular over-the-air communication between the mobile device 102 and the network 131.

In some embodiments, the mobile device 102 may comprise an in-vehicle head unit, wherein the head unit comprises an NFC transceiver 114. A service tool 133 may be used to provide provisioning data to the head unit, wherein the service tool 133 may be used "in the field" when the vehicle is purchased to customize the head unit based on user preferences. Additionally, the head unit may receive provisioning data during a manufacturing process in a similar fashion as described above, wherein the provisioning data may be communicated from a provisioning platform 130. The service tool 133 may also be used to perform maintenance and/or updates for an in-vehicle head unit.

Embodiments of the disclosure may contemplate the use of other types of antennas (other than near field communication) within the mobile device 102 to receive provisioning data. In an embodiment, the cellular radio transceiver 104 of the mobile device 102 may be used to receive the provisioning data from a provisioning platform 130. While the mobile device is not powered by any other source, an energizing field from the provisioning platform 130 may energize a power receiving antenna 120. The power receiving antenna 120 may then provide power to the cellular radio transceiver 104, and the radio transceiver 104 may then receive provisioning data via a communication field from the provisioning platform 130. The provisioning data may then be stored in storage 110 associated or coupled with the cellular radio transceiver 104. An activation application 116 may then access the provisioning data and complete a provisioning process, as described in previous embodiments. In an embodiment, the energizing field and communication field may emit on different channels, so as not to interfere with one another or cause interference between the antennas.

Figure 2:
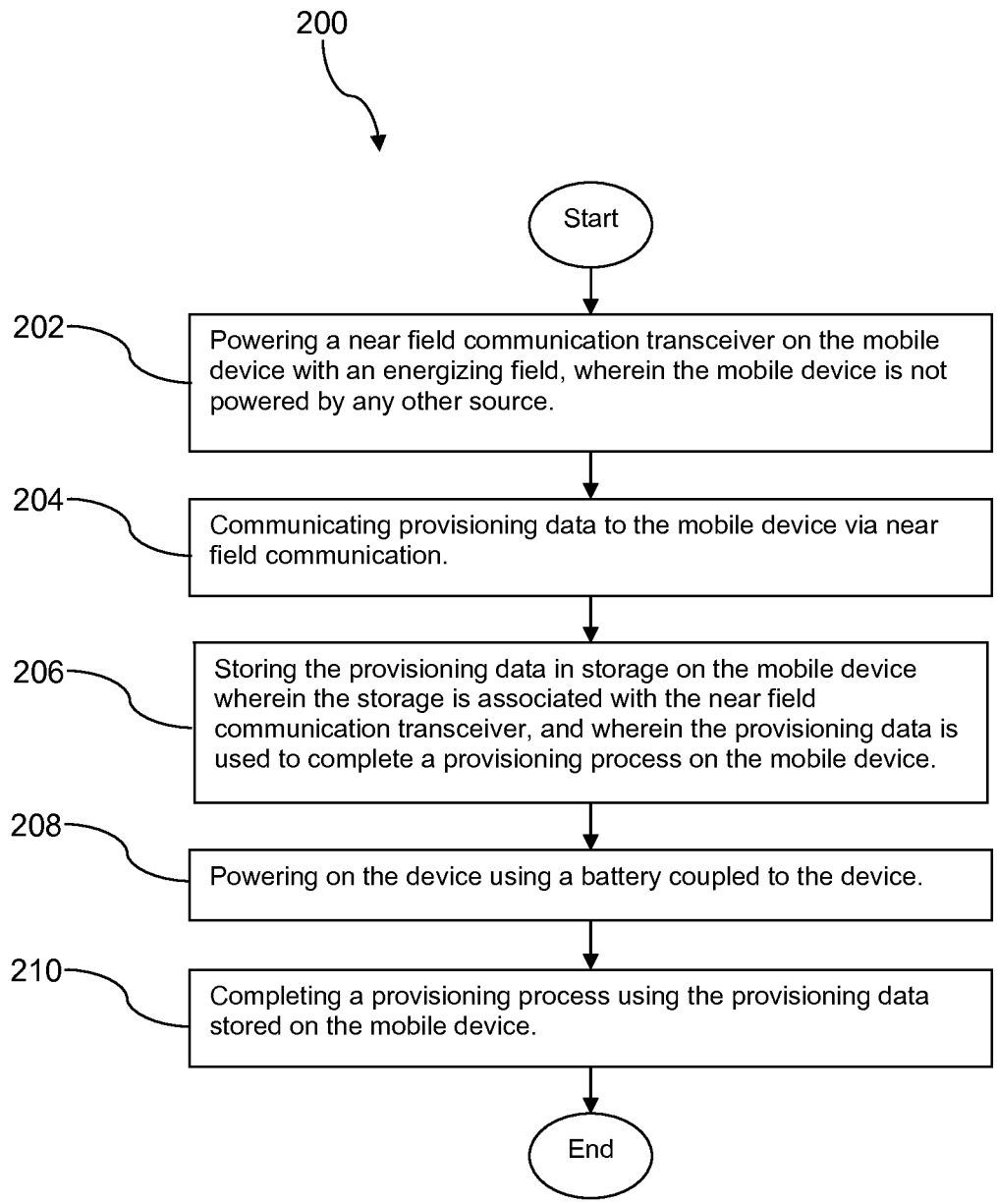
FIG. 2 is a flow chart illustrating a method according to an embodiment of the disclosure.

FIG. 2 illustrates a method 200 for customizing and provisioning a mobile device, according to an embodiment of the disclosure. The method 200 comprises, at block 202, powering a near field communication transceiver on the mobile device with an energizing field, wherein the mobile device is not powered by any other source. For example, the mobile device may not be powered by any battery power source. Then, at block 204, the method may comprise communicating provisioning data to the mobile device via near field communication (NFC). The mobile device may be NFC-enabled by the near field communication transceiver and may be operable to receive data sent over an NFC link. In an embodiment, the communicating and powering may both be accomplished by a provisioning platform. At block 206, the method may comprise storing the provisioning data in storage on the mobile device, wherein the storage may be associated with the near field communication transceiver. Additionally, the provisioning data may be used to complete a provisioning process on the mobile device. At block 208, the method may comprise powering on the device using a battery coupled to the device, wherein the near field communication transceiver is no longer powered by an energizing field. Then, at block 210, the method may comprise completing a provisioning process using the provisioning data stored on the mobile device, wherein the provisioning process may be completed by an activation application on the mobile device.

Figure 3:
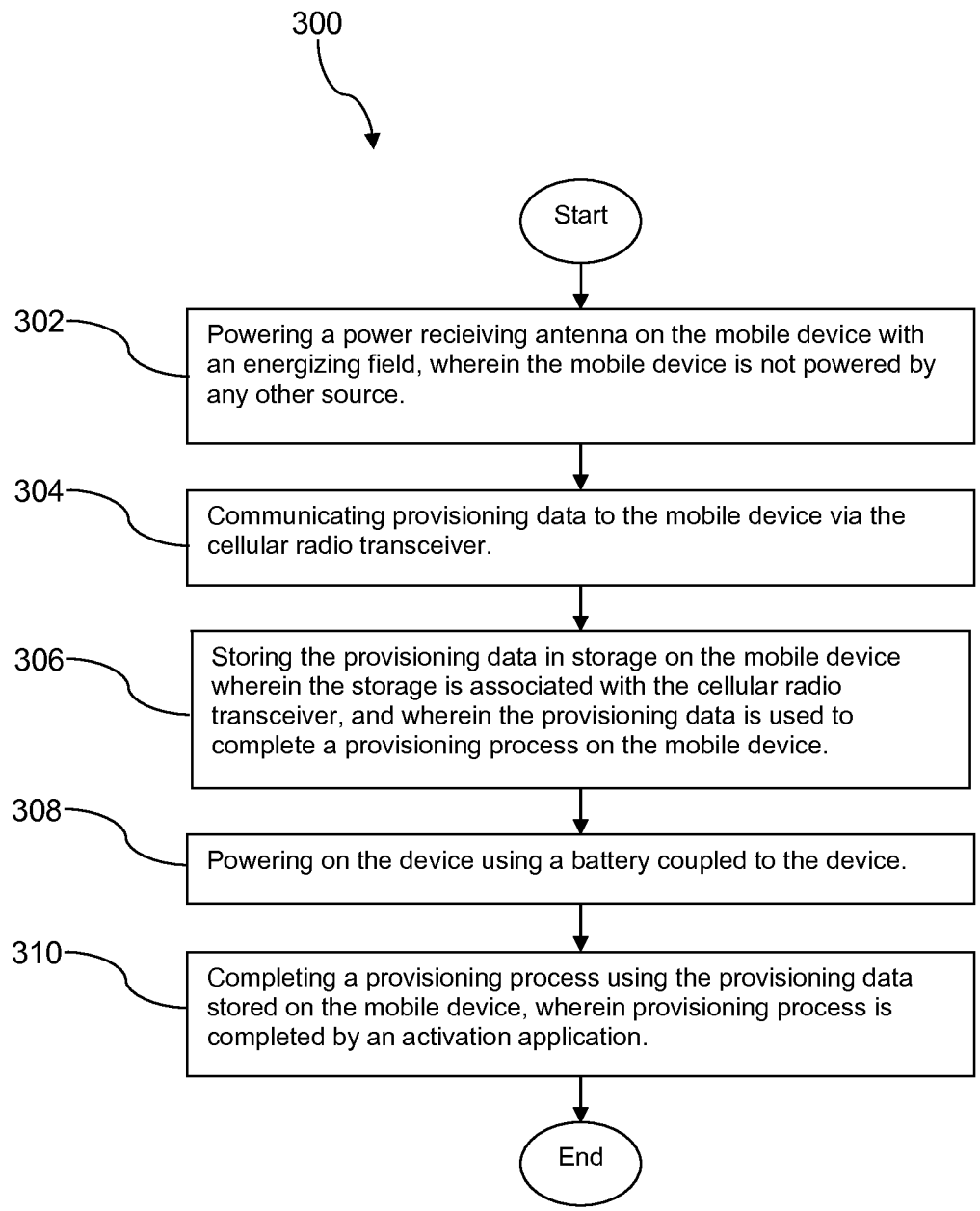
FIG. 3 is a flow chart illustrating another method according to an embodiment of the disclosure.

FIG. 3 illustrates a method 300 for customizing and provisioning a mobile device, according to an embodiment of the disclosure. The method 300 comprises, at block 302, powering a power receiving antenna on the mobile device with an energizing field, wherein the mobile device is not powered by any other source. For example, the mobile device may not be powered by any battery power source. Then, at block 304, the method may comprise communicating provisioning data to the mobile device via the cellular radio transceiver of the mobile device. The power receiving antenna may be operable to power the cellular radio transceiver and therefore enable the cellular radio transceiver to receive and process data. In an embodiment, the communicating and powering may both be accomplished by a provisioning platform. At block 306, the method may comprise storing the provisioning data in storage on the mobile device, wherein the storage may be associated with the cellular radio transceiver. Additionally, the provisioning data may be used to complete a provisioning process on the mobile device. At block 308, the method may comprise powering on the device using a battery coupled to the device, wherein the power receiving antenna is no longer powered by an energizing field. Then, at block 310, the method may comprise completing a provisioning process using the provisioning data stored on the mobile device, wherein the provisioning process may be completed by an activation application on the mobile device.

Figure 4:
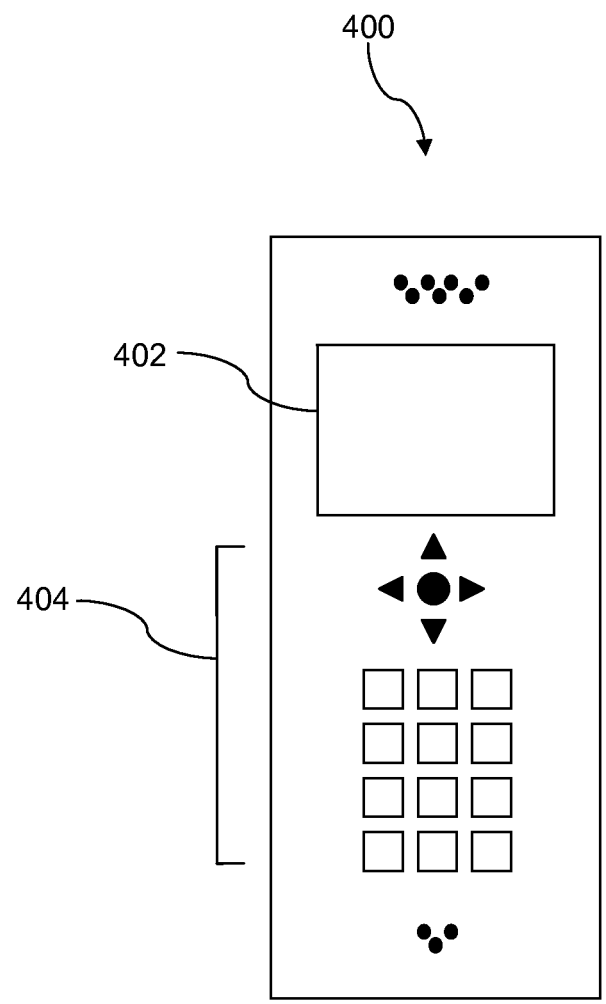
FIG. 4 is an illustration of a mobile communication device according to an embodiment of the disclosure.

FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
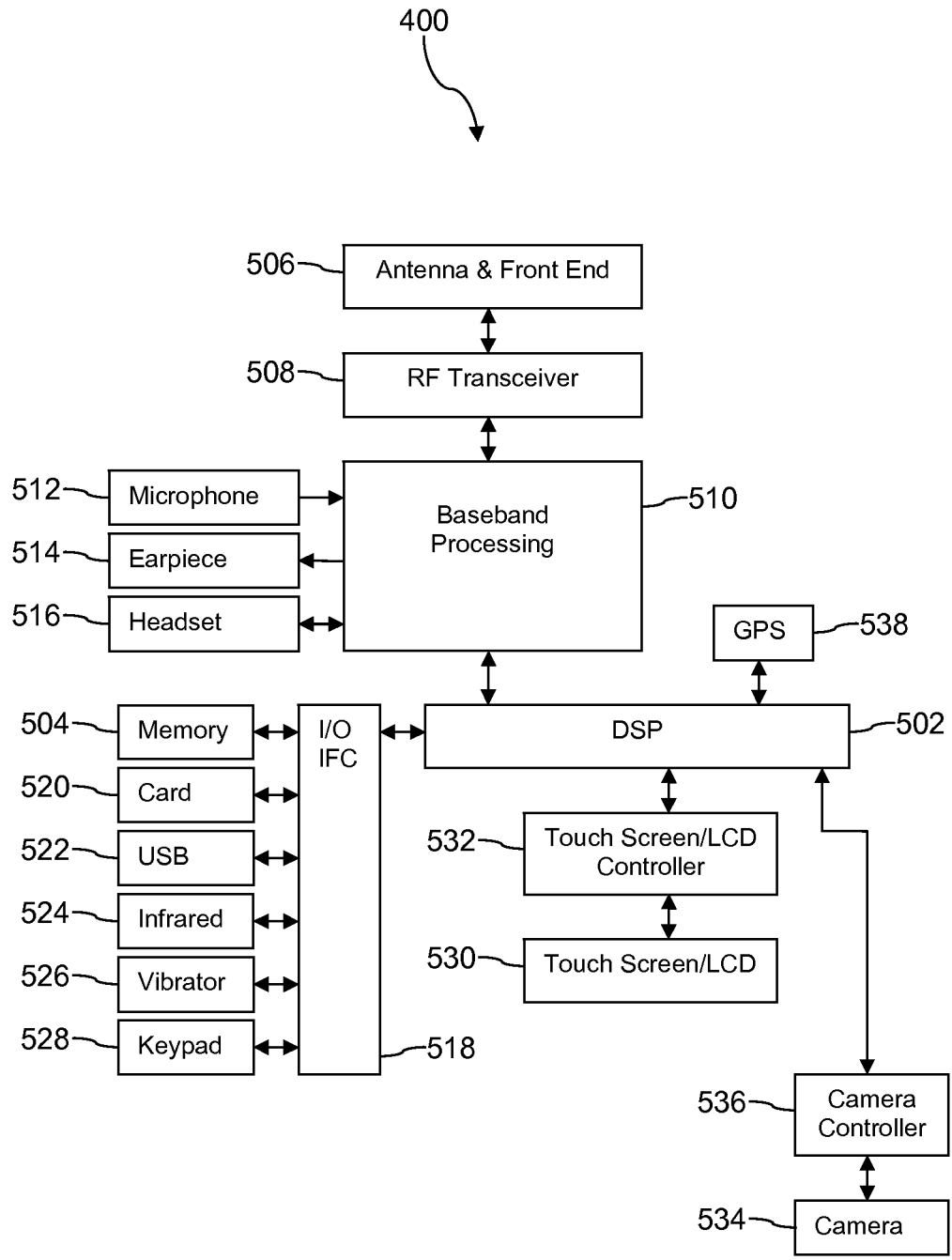
FIG. 5 is a block diagram of a mobile communication device according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
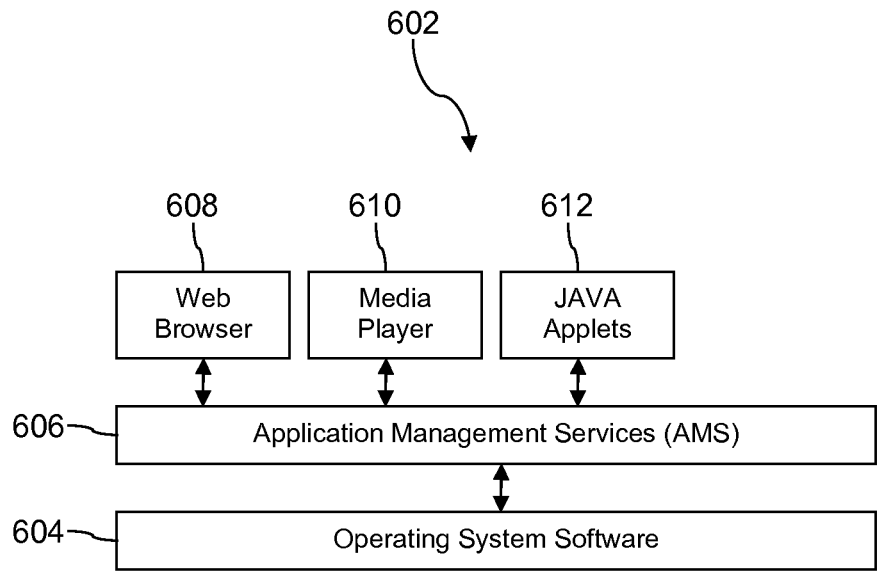
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
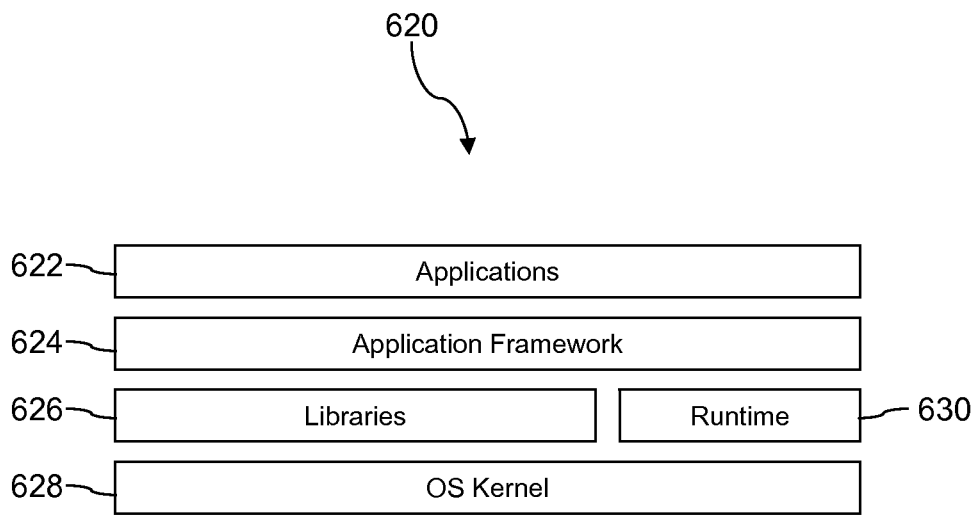
FIG. 6B is a block diagram of another software architecture of a mobile communication device according to an embodiment of the disclosure.

FIG. 6B illustrates an alternative software environment 620 that may be implemented by the DSP 502. The DSP 502 executes operating system software 628 (for example an operating system kernel) and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
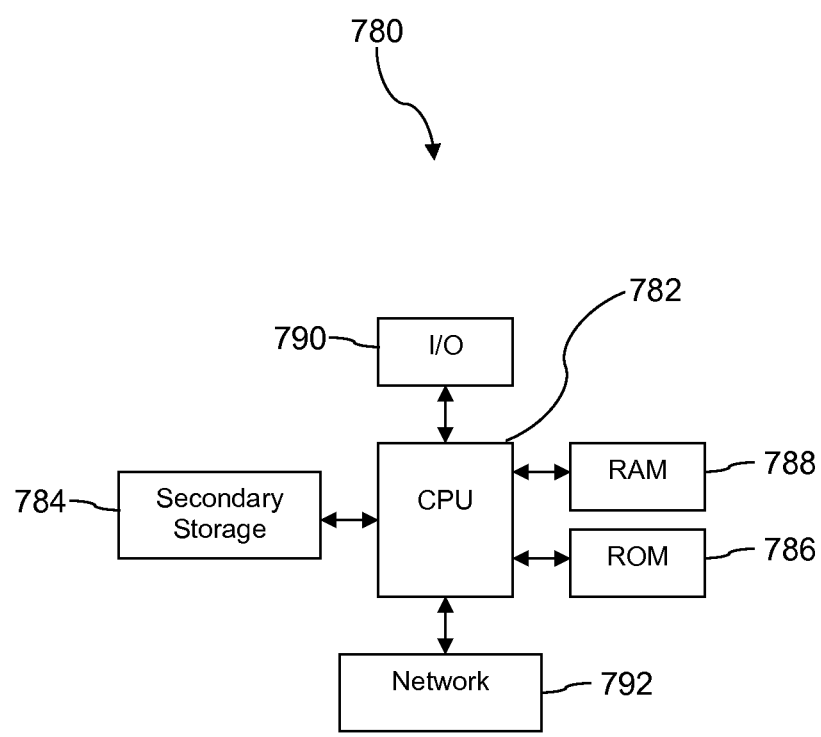
FIG. 7 illustrates an exemplary computer system suitable for implementing the several embodiments of the disclosure.

FIG. 7 illustrates a computer system suitable for implementing one or more embodiments disclosed herein. The computer system 780 includes a processor 702 (which may be referred to as a central processor unit or CPU) that is in communication with memory devices including secondary storage 704, read only memory (ROM) 706, random access memory (RAM) 708, input/output (I/O) devices 710, and network connectivity devices 712. The processor 702 may be implemented as one or more CPU chips.

It is understood that by programming and/or loading executable instructions onto the computer system 780, at least one of the CPU 702, the RAM 708, and the ROM 706 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 704 is typically comprised of one or more disk drives or tape drives and is used for non-volatile storage of data and as an over-flow data storage device if RAM 708 is not large enough to hold all working data. Secondary storage 704 may be used to store programs which are loaded into RAM 708 when such programs are selected for execution. The ROM 706 is used to store instructions and perhaps data which are read during program execution. ROM 706 is a non-volatile memory device which typically has a small memory capacity relative to the larger memory capacity of secondary storage 704. The RAM 708 is used to store volatile data and perhaps to store instructions. Access to both ROM 706 and RAM 708 is typically faster than to secondary storage 704. The secondary storage 704, the RAM 708, and/or the ROM 706 may be referred to in some contexts as computer readable storage media and/or non-transitory computer readable media.

I/O devices 710 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 712 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 712 may enable the processor 702 to communicate with the Internet or one or more intranets. With such a network connection, it is contemplated that the processor 702 might receive information from the network, or might output information to the network in the course of performing the above-described method steps. Such information, which is often represented as a sequence of instructions to be executed using processor 702, may be received from and outputted to the network, for example, in the form of a computer data signal embodied in a carrier wave.

Such information, which may include data or instructions to be executed using processor 702 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 702 executes instructions, codes, computer programs, scripts which it accesses from hard disk, floppy disk, optical disk (these various disk based systems may all be considered secondary storage 704), ROM 706, RAM 708, or the network connectivity devices 712. While only one processor 702 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 704, for example, hard drives, floppy disks, optical disks, and/or other device, the ROM 706, and/or the RAM 708 may be referred to in some contexts as non-transitory instructions and/or non-transitory information.

In an embodiment, the computer system 780 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 780 to provide the functionality of a number of servers that is not directly bound to the number of computers in the computer system 780. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 704, to the ROM 706, to the RAM 708, and/or to other non-volatile memory and volatile memory of the computer system 780. The processor 702 may process the executable instructions and/or data structures in part by directly accessing the computer program product, for example by reading from a CD-ROM disk inserted into a disk drive peripheral of the computer system 780. Alternatively, the processor 702 may process the executable instructions and/or data structures by remotely accessing the computer program product, for example by downloading the executable instructions and/or data structures from a remote server through the network connectivity devices 712. The computer program product may comprise instructions that promote the loading and/or copying of data, data structures, files, and/or executable instructions to the secondary storage 704, to the ROM 706, to the RAM 708, and/or to other non-volatile memory and volatile memory of the computer system 780.

In some contexts, the secondary storage 704, the ROM 706, and the RAM 708 may be referred to as a non-transitory computer readable medium or a computer readable storage media. A dynamic RAM embodiment of the RAM 708, likewise, may be referred to as a non-transitory computer readable medium in that while the dynamic RAM receives electrical power and is operated in accordance with its design, for example during a period of time during which the computer 780 is turned on and operational, the dynamic RAM stores information that is written to it. Similarly, the processor 702 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of provisioning a mobile device comprising:
   prior to the mobile device being provisioned for communication services with a communications network:
      powering, by a provisioning platform that includes a non-transitory memory and executes at least one processor, a near field communication transceiver on the mobile device with an energizing radio field from the provisioning platform;
      communicating, by the provisioning platform, provisioning data to the mobile device via near field communication, wherein the near field communication transceiver and the mobile device are not powered by any other source during the communication of the provisioning data; and
      responsive to communicating the provisioning data, storing the provisioning data in a non-transitory storage on the mobile device, the non-transitory storage being associated with the near field communication transceiver, wherein the provisioning data is used to complete a provisioning process on the mobile device, and wherein the provisioning process provisions the mobile device for communication services with the communications network.

2. The method of claim 1 further comprising:
   powering on the mobile device using a battery coupled to the mobile device; and
   completing a provisioning process using the provisioning data communicated to the mobile device by near field communication.

3. The method of claim 2 wherein the provisioning process is completed by an activation application on the mobile device.

4. The method of claim 1 wherein the non-transitory storage comprises a secure element coupled to the near field communication transceiver.

5. The method of claim 1 wherein a near field communication pad at a retail location provides the energizing radio field and communicates the provisioning data.

6. The method of claim 5 wherein the retail location comprises a self-service kiosk.

7. The method of claim 1 wherein the provisioning data comprises one or more of: service provider information, service preference information, branding information, technical parameters, and user credentials.

8. The method of claim 7 wherein the provisioning data is at least partially compiled from user input preferences or options.

9. The method of claim 1 wherein the powering of the near field communication transceiver and communicating the provisioning data is completed by a fulfillment center at a warehouse, manufacturing or storage facility before the mobile device is shipped to a user.

10. A method of provisioning a mobile device comprising:
   prior to the mobile device being provisioned for communication services with a communications network:
      temporarily powering, by a provisioning platform that includes a non-transitory memory and executes at least one processor, a near field communication transceiver on the mobile device with an energizing radio field, wherein the energizing radio field is provided by the provisioning platform at a retail location;
      communicating, by the provisioning platform, provisioning data to the mobile device via near field communication, wherein the communicating is completed while the near field communication transceiver and the mobile device are not powered by a battery coupled to the mobile device;

storing the provisioning data in a secure element on the mobile device, wherein the secure element is a non-transitory storage and is associated with the near field communication transceiver;

after storing the provisioning data in the secure element, powering on the mobile device using at least the battery coupled to the mobile device; and subsequent to the mobile device being powered by the battery, completing a provisioning process, on the mobile device, using the provisioning data stored in the secure element while the mobile device was not powered by the battery, wherein the provisioning process provisions the mobile device for communication services with the communications network.

11. The method of claim 10 wherein the provisioning process is completed by an activation application on the mobile device.

12. The method of claim 11 wherein the activation application searches the secure element for the provisioning data when the mobile device is powered on.

13. The method of claim 12 wherein the secure element is cleared of the provisioning data after the provisioning data has been accessed by the activation application.

14. The method of claim 11 wherein the activation application searches the secure element for the provisioning data only if the mobile device is in an un-provisioned state.

15. A method of provisioning or performing maintenance on a plurality of mobile devices comprising:

prior to a first mobile device of the plurality of mobile devices being provisioned for communication services with a communications network:

powering, by a provisioning platform that includes a non-transitory memory and executes at least one processor, an antenna on the first mobile device with an energizing radio field from the provisioning platform, wherein the first mobile device is not powered by any other source;

communicating, by the provisioning platform, provisioning data to the first mobile device via a communication radio field from the provisioning platform;

storing the provisioning data in a non-transitory storage on the first mobile device, wherein the non-transitory storage is associated with the antenna on the first mobile device, and wherein the provisioning data initiates a provisioning process on the first mobile device for communication services with the communications network;

subsequent to a second mobile device of the plurality of mobile devices being provisioned for communication services with the communications network:

powering, by the provisioning platform, an antenna on the second mobile device with an energizing radio field from the provisioning platform, wherein the second mobile device is not powered by any other source;

communicating, by the provisioning platform, maintenance data to the second mobile device via a communication radio field from the provisioning platform; and storing the maintenance data in a non-transitory storage on the second mobile device, wherein the non-transitory storage is associated with the antenna on the second mobile device.

16. The method of claim 15 further comprising:

powering on at least the first mobile device using a battery coupled to the device; and responsive to the powering on of the first mobile device, completing the provisioning process using the provisioning data stored on the first mobile device while the first mobile device was powered by the energizing radio field.

17. The method of claim 15 wherein the antenna of the first mobile device comprises a near field communication antenna.

18. The method of claim 15 wherein powering of the antenna of the first mobile device and communicating of the provisioning data is performed by a field support tool or service unit.

19. The method of claim 15 wherein access to a cellular network is not required to provision or perform maintenance on the device.

20. The method of claim 15 wherein the powering and the communicating are performed by a near field communication pad at a retail location, wherein the near field communication pad is the provisioning platform.

* * * * *